United States Patent
Harrington et al.

(10) Patent No.: US 12,158,210 B2
(45) Date of Patent: Dec. 3, 2024

(54) SELF-LUBRICATING, WEAR RESISTANT PISTON SEAL

(71) Applicant: RTX Corporation, Farmington, CT (US)

(72) Inventors: Kelly M. Harrington, Deerfield, NH (US); Pantcho P. Stoyanov, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/182,598

(22) Filed: Feb. 23, 2021

(65) Prior Publication Data

US 2021/0270369 A1    Sep. 2, 2021

Related U.S. Application Data

(60) Provisional application No. 62/982,647, filed on Feb. 27, 2020.

(51) Int. Cl.
*F16J 15/56*    (2006.01)
*F16J 9/26*    (2006.01)

(52) U.S. Cl.
CPC ..................................... *F16J 9/26* (2013.01)

(58) Field of Classification Search
CPC .......... F16J 9/00; F16J 9/12; F16J 9/26; F16J 15/56
See application file for complete search history.

(56) References Cited

U.S. PATENT DOCUMENTS

| | | |
|---|---|---|
| 4,728,448 A | 3/1988 | Sliney |
| 7,998,604 B2 | 8/2011 | Reynolds et al. |
| 8,541,349 B2 | 9/2013 | Xiao et al. |
| 8,753,417 B1 | 6/2014 | Dellacorte et al. |
| 10,233,934 B2 | 3/2019 | Marya et al. |
| 2007/0003693 A1 | 1/2007 | Lee et al. |
| 2018/0038276 A1 | 2/2018 | Durrett et al. |
| 2019/0107202 A1* | 4/2019 | Shah ...................... F01D 11/12 |

FOREIGN PATENT DOCUMENTS

| | | | |
|---|---|---|---|
| CN | 110230018 A | * | 9/2019 |
| WO | 2015101699 A1 | | 7/2015 |

OTHER PUBLICATIONS

European search report for patent application No. 21 16 0056 dated Jul. 19, 2021.

* cited by examiner

*Primary Examiner* — Gilbert Y Lee
(74) *Attorney, Agent, or Firm* — Bachman & LaPointe, P.C.

(57) ABSTRACT

A piston seal assembly for a gas turbine engine includes a seal formed of a nickel-based superalloy; a component in contact with the seal and defining a seal-counterface; and a coating on the seal at the seal-counterface, wherein the coating is a nanostructured, self-lubricating coating material.

14 Claims, 3 Drawing Sheets

SELF-LUBRICATING, WEAR RESISTANT PISTON SEAL

BACKGROUND OF THE DISCLOSURE

The disclosure relates to a piston seal for a gas-turbine engine, more particularly to a self-lubricating, wear resistant piston seal for a mid-turbine-frame seal location of a gas turbine engine.

Piston rings and seals are utilized in numerous areas in gas turbine engines and can be utilized in areas such as the mid-turbine-frame seal areas which are subject to very high temperatures (approaching 1, 600° F.) and also subject to vibratory motion which can lead to significant wear.

One configuration of piston rings for piston seal assemblies is made with nickel-based alloys such as large grain nickel-based superalloy. These materials can be age hardened austenitic nickel-based superalloys which improve creep resistance of the piston ring. However, piston rings made from this nickel-based superalloy still show significant wear to the ring as well as increased wear to the counterface. Specifically, it was found that chromia and alumina formed on the surface of the piston ring, when operated at high temperatures, and this resulted in increased friction leading to additional wear. Thus, the need remains for a piston ring suitable for use under the aforesaid conditions which has acceptable creep and wear resistance.

SUMMARY OF THE DISCLOSURE

In one non-limiting configuration, a piston seal assembly for a gas turbine engine, comprises a seal comprised of a nickel-based superalloy; a component in contact with the seal and defining a seal-counterface; and a coating on the seal at the seal-counterface, wherein the coating comprises a nanostructured, self-lubricating coating material.

In a further non-limiting configuration, the coating has a thickness of between 4 and 10 mils.

In a still further non-limiting configuration, the coating has a thickness of between 4 and 7 mils.

In another configuration, the coating comprises a binder matrix, a hardener and a solid lubricant.

In still another configuration, the binder matrix is a nickel-based composition selected from the group consisting of NiCr, Ni—Co, NiMoAl and combinations thereof.

In a further non-limiting configuration, the hardener is selected from the group consisting of glass, chrome carbide ($Cr_3C_2$), chrome oxide and combinations thereof.

In a still further non-limiting configuration, the solid lubricant is selected from the group consisting of silver, calcium fluoride, barium fluoride and combinations thereof.

In another non-limiting configuration, the nanostructured, self-lubricating coating material is selected from the group consisting of NiCr—$CaF_2$-glass, NiCr—$CaF_2$-glass-Ag, Ni—Co—$Cr_3C_2$—Ag—$BaF_2/CaF_2$, NiCr—$Cr_2O_3$—Ag—$BaF_2/CaF_2$ and NiMoAl—$Cr_2O_3$—Ag—$BaF_2/CaF_2$.

In another non-limiting configuration, the nanostructured, self-lubricating coating material is selected from the group consisting of NiCr—$Cr_2O_3$—Ag—$BaF_2/CaF_2$ and NiMoAl—$Cr_2O_3$—Ag—$BaF_2/CaF_2$, and mixtures thereof.

In still another non-limiting configuration, the seal comprises an age hardening austenitic nickel-based superalloy.

In a further non-limiting configuration, the seal has non-contact surfaces that are not in contact with the component, and the coating is on the seal at the seal-counterface, and not on the non-contact surfaces.

In a still further non-limiting configuration, the component comprises two components, with the seal mounted between the two components to define two seal-counterfaces, and wherein the coating is on the seal at both of the two seal-counterfaces.

In another configuration, the two components comprise a mid-turbine-frame (MTF) vane and an outer air seal.

In still another configuration, the component has a counterface that defines, with the seal, the seal-counterface, and further comprising a further coating on the counterface.

In a further configuration, the further coating comprises the same material as the coating on the seal.

In a non-limiting configuration, a seal for a gas turbine engine comprises a seal comprised of a nickel-based superalloy and a coating on the seal, wherein the coating comprises a nanostructured, self-lubricating coating material.

In another non-limiting configuration, the coating has a thickness of between 4 and 10 mils.

In still another non-limiting configuration, the coating has a thickness of between 4 and 7 mils.

In a further non-limiting configuration, the coating comprises a binder matrix, a hardener and a solid lubricant.

In a still further non-limiting configuration, the binder matrix is a nickel-based composition selected from the group consisting of NiCr, Ni—Co, NiMoAl and combinations thereof.

In another non-limiting configuration, the hardener is selected from the group consisting of glass, chrome carbide ($Cr_3C_2$), chrome oxide and combinations thereof.

In still another non-limiting configuration, the solid lubricant is selected from the group consisting of silver, calcium fluoride, barium fluoride and combinations thereof.

In another non-limiting configuration, the nanostructured, self-lubricating coating material is selected from the group consisting of NiCr—$CaF_2$-glass, NiCr—$CaF_2$-glass-Ag, Ni—Co—$Cr_3C_2$—Ag—$BaF_2/CaF_2$, NiCr—$Cr_2O_3$—Ag—$BaF_2/CaF_2$ and NiMoAl—$Cr_2O_3$—Ag—$BaF_2/CaF_2$.

In a further non-limiting configuration, the nanostructured, self-lubricating coating material is selected from the group consisting of NiCr—$Cr_2O_3$—Ag—$BaF_2/CaF_2$ and NiMoAl—$Cr_2O_3$—Ag—$BaF_2/CaF_2$, and mixtures thereof.

In a still further non-limiting configuration, the seal comprises an age hardening austenitic nickel-based superalloy.

Numerous different non-limiting configurations are disclosed herein. While these features and configurations are individually addressed, it should be appreciated that these same features are also readily combinable in a single configuration, well within the scope of the disclosure.

BRIEF DESCRIPTION OF THE DRAWINGS

A detailed description of preferred embodiments of the disclosure follows, with referenced to the attached drawings, wherein.

Like reference numbers and designations in the various drawings indicate like elements.

DETAILED DESCRIPTION

The present disclosure relates to a piston seal assembly and, more particularly, to a piston seal assembly for a gas turbine engine which can be utilized in areas of high temperature and high vibratory motion. The seal assembly as disclosed herein possesses excellent creep and wear resistance at high temperatures, and is self-lubricating.

Figure 1:
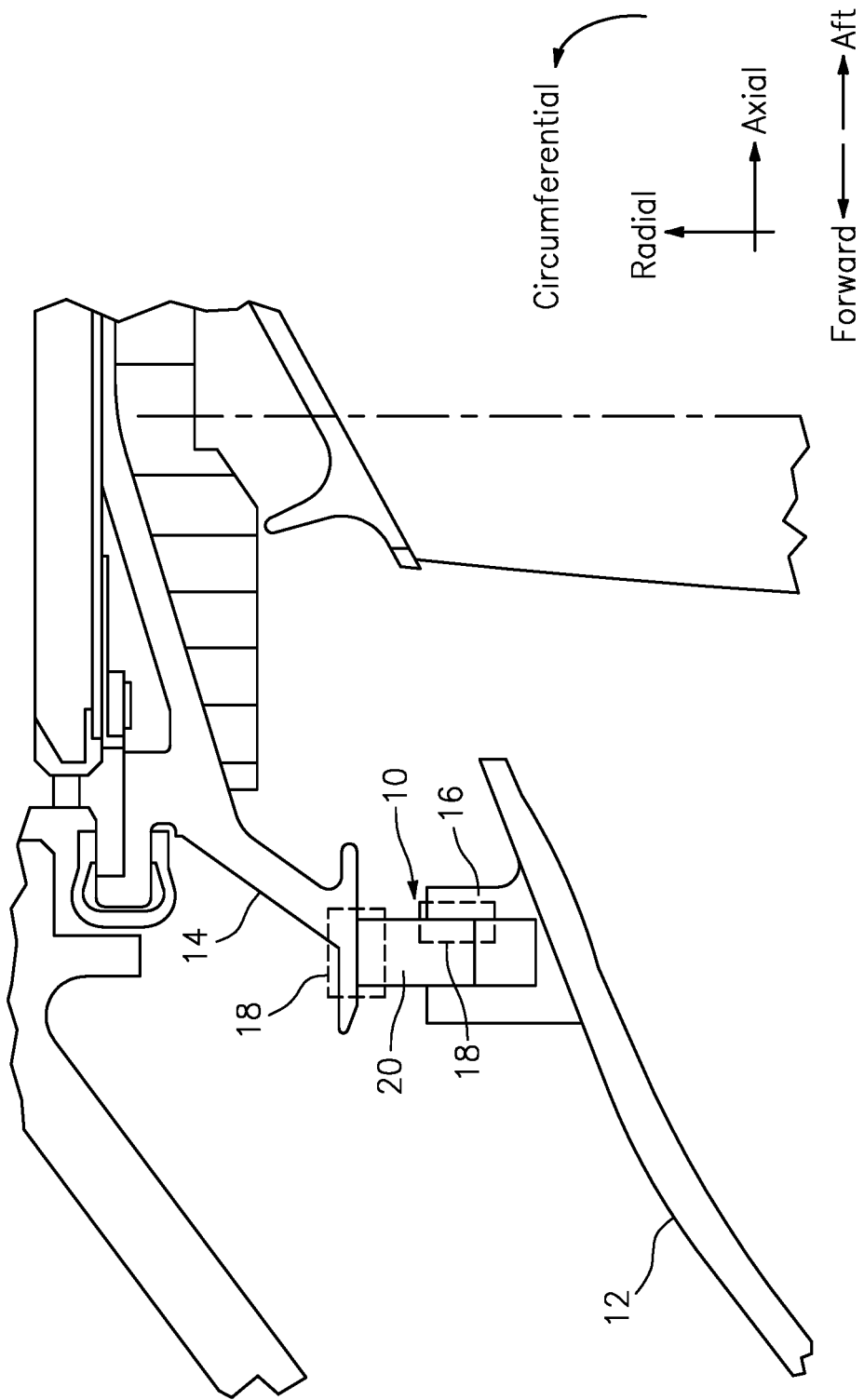
FIG. 1 shows a mid-turbine-frame (MTF) piston seal assembly.

FIG. 1 shows a mid-turbine-frame (MTF) location of a gas-turbine engine, and shows a seal assembly 10 positioned between an MTF vane 12 and an outer air seal 14. MTF 12 can suitably have a counterface component 16 for holding a seal such as a seal ring, illustrated as seal body 20, such that seal body 20 is in sealing contact with counterface component 16 and also with outer air seal 14.

Areas of contact between seal body 20 and components such as counterface component 16 or outer air seal 14 establish seal-counterface areas 18 between the seal and these structures, and these seal-counterface areas are subjected to significant vibratory motion, which, as mentioned above, can lead to problems of creep and high wear, particularly when subjected to high temperatures, for example approaching 1600° F.

FIG. 1 shows only a portion of the gas turbine engine for which the seal assembly can be utilized, and radial, axial and circumferential directions as well as forward and aft vectors related to the engine are all as shown in FIG. 1. Of course, this location is a non-limiting example of application of the self-lubricating coating and coated seal disclosed herein, and the coating can be utilized on seal assemblies in other areas as well, particularly where the same needs might be present.

The present disclosure relates to a coating strategy which is utilized on seal body 20 at the seal-counterface areas 18 to address wear at these areas when operated at high temperatures.

Figure 2:
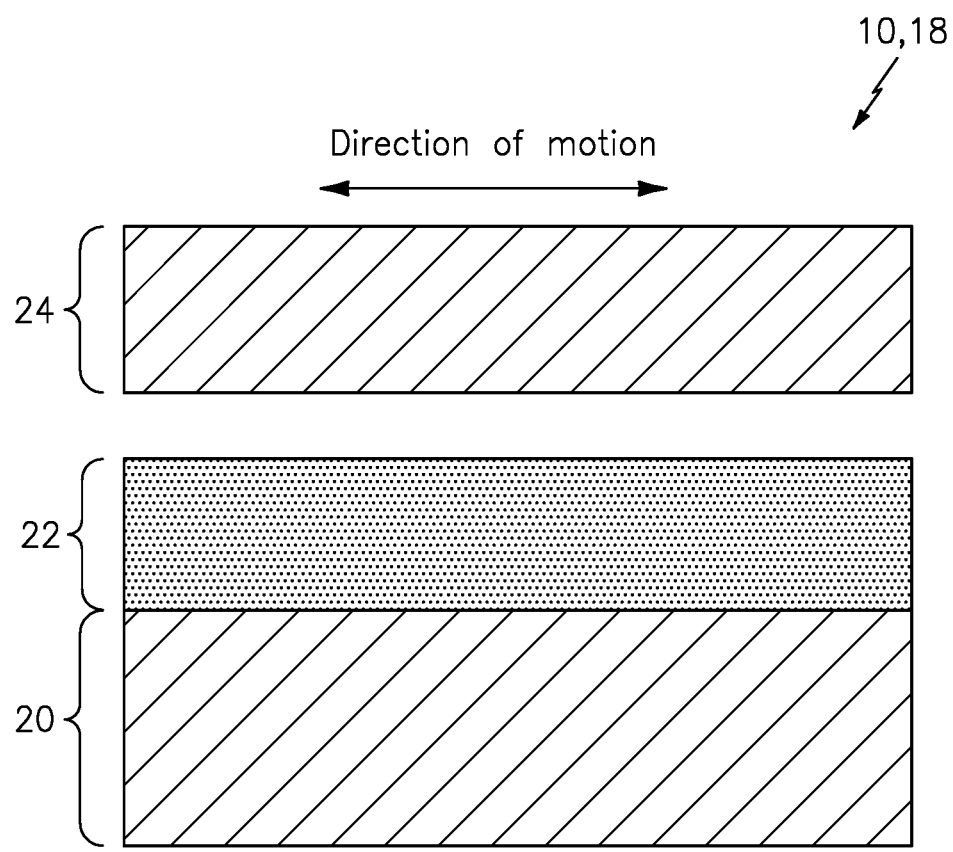
FIG. 2 schematically illustrates a coated seal member.

FIG. 2 shows an enlarged portion of a seal body 20 of a seal assembly 10, for example corresponding to either of areas 18 shown in FIG. 1, wherein the seal body 20 has a coating 22 applied thereto. A counterface 24 is shown and can correspond, for example, to surfaces of outer air seal 14 or counterface component 16 as discussed above.

Coating 22 is a nanostructured and self-lubricating coating that can be applied to seal body 20 using known techniques such as plasma spray as one non-limiting example.

Coating 22 can be applied to have a thickness between 4 and 10 mils. In a further non-limiting configuration, the thickness can be between 4 and 7 mils. In one non-limiting configuration, the coating can be applied by spraying a thicker coating and then grinding down to the desired thickness range.

The coating is a composition containing a binder matrix, a hardener and one or more solid lubricants. The binder matrix can, for example, be a nickel-based composition such as NiCr, Ni—Co or NiMoAl. The hardener can be one or more of glass, chrome carbide ($Cr_3C_2$), chrome oxide or the like. Solid lubricants can be silver (Ag), calcium fluoride, barium fluoride and combinations thereof.

Four examples of suitable coating families are identified as PS100, PS200, PS300 and PS400. Relative compositions of components of these coatings are set forth below, with percentages being based on weight in the overall coating composition except as otherwise specified:

| Coating | Binder matrix | Hardener | Solid lubricants |
| --- | --- | --- | --- |
| PS100 family | 30-67% NiCr | 0-16.5% Glass | 0-30% Ag<br>16.5-25% Calcium fluorides |
| PS200 family | 0-32% Ni—Co | 48-85% Chrome carbide ($Cr_3C_2$) | 0-30% Ag<br>0-30% Barium/calcium fluorides |
| PS300 family | 20-60% NiCr | 20-60% Chrome oxide | 6-10% Ag<br>6-10% barium/calcium fluoride |
| PS400 | 50-90% NiMoAl | 5-40% Chrome oxide | 0.1-10% Ag<br>1-20% barium/calcium fluorides |

In this disclosure, the coating contains solid lubricants and hardeners dispersed in or distributed through a matrix, and these solid lubricants can provide a lower friction interface as well as enhanced stability of a glaze layer that is formed under operation conditions, specifically elevated temperature sliding interaction with the counterface.

Thus, a broad and non-limiting group of coating materials based on the above table is NiCr—$CaF_2$-glass, NiCr—$CaF_2$-glass-Ag, Ni—Co—$Cr_3C_2$—Ag—$BaF_2/CaF_2$, NiCr—$Cr_2O_3$—Ag—$BaF_2/CaF_2$ and NiMoAl—$Cr_2O_3$—Ag—$BaF_2/CaF_2$. Within this group, two specific non-limiting examples of suitable material for coating 22 are NiCr—$Cr_2O_3$—Ag—$BaF_2/CaF_2$ and NiMoAl—$Cr_2O_3$—Ag—$BaF_2/CaF_2$.

The seal body 20 to which these coatings can be applied can be a nickel-based superalloy, more particularly, an age hardening austenitic nickel-based superalloy such as Waspaloy™. Seal bodies made from this material have been found to help address creep resistance, but this also leads to increased problems due to wear, and coatings such as those disclosed herein can help address this wear at the high temperatures to which they will be exposed, for example when used in an MTF piston seal.

Figure 3:
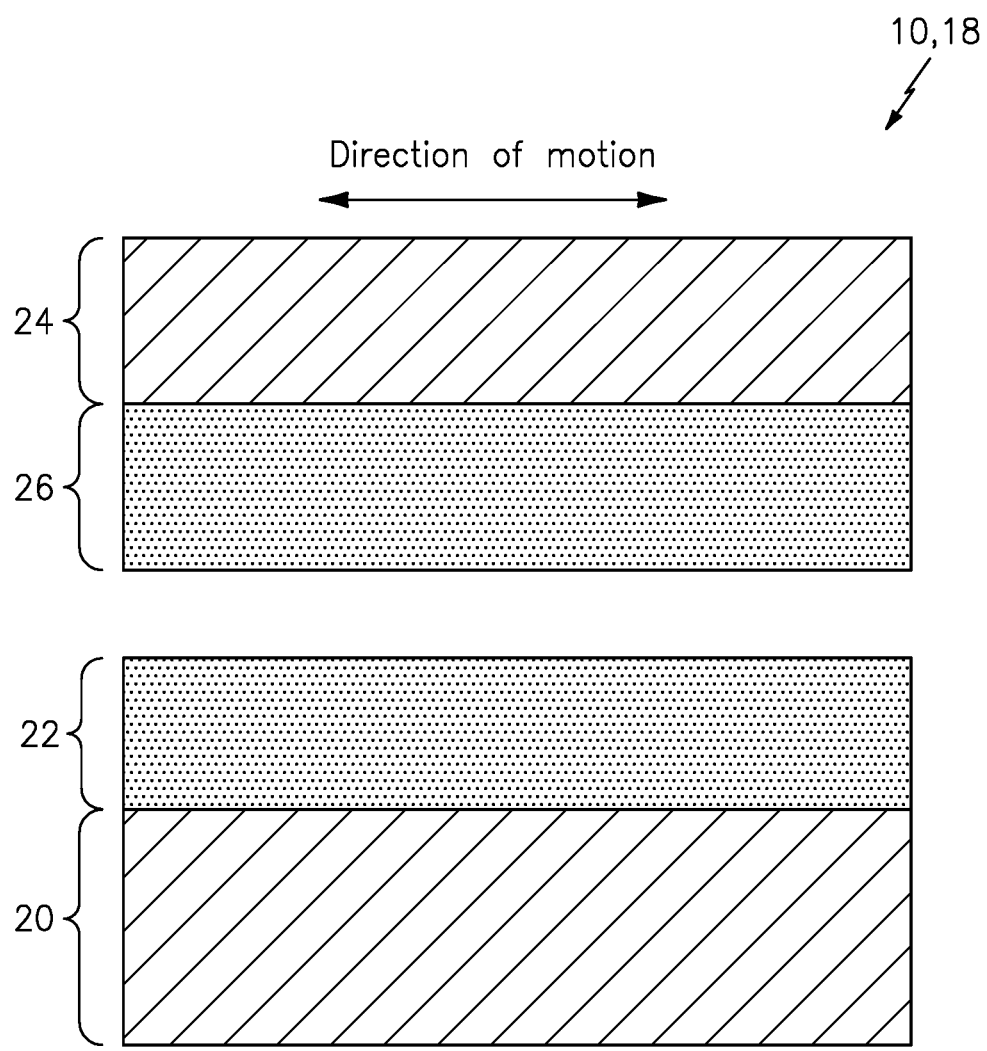
FIG. 3 schematically illustrates a coated seal member with a coated counterface.

FIG. 3 shows a further non-limiting configuration wherein coating 22 is applied on a portion of a seal body 20 as with the configuration of FIG. 2, but wherein a further coating 26 is also applied to counterface 24. Applying the self-lubricating coating to both the surfaces of the seal interface can help even further to address the wear experienced with known piston seals.

Seal body 20 can have coating 22 applied at portions or areas corresponding to seal-counterface areas 18 (FIG. 1), where seal body 20 contacts components such as counterface component 16 and outer air seal 14. As set forth above, coating 22 can be formulated from a material such that the resulting coating will have a metal alloy binder phase as well as a hard particle phase distributed through the binder phase. It has been found that while the underlying seal body material addresses issues of creep resistance, the coating as disclosed herein provides a desired level of wear resistance to the seal body 20 such that both the seal body 20 and counterface components such as counterface component 16 or outer air seal 14 are protected from excessive wear which can be caused by the high temperature, high vibratory conditions surrounding the seal.

In one non-limiting configuration, the seal body 20 can be made of or comprise a nickel-based superalloy, more specifically an age hardening austenitic nickel-based superalloy, one suitable example of which is Waspaloy™, although other nickel-based superalloys may be suitable as well, particularly those with a large grain size.

It should be appreciated that a piston seal according to the present disclosure, which can typically be in a ring form, can be positioned between various components, such as in the counterface component 16 and contacting outer air seal 14 as shown in FIG. 1. Seal body 20 will have areas where contact is made with other components, and other non-contact areas which are not in contact with any other structures. While the entire seal body could be coated with the coating composition disclosed herein, it may be preferable in order to conserve resources and avoid excessive weight to apply the coating to the seal only in the areas of contact with the other components, specifically at the seal-counterface areas 18.

The lubrication strategy disclosed herein, utilizing a nanostructured self-lubricating coating material, provides wear resistance even at high temperatures, and thereby produces low friction, wear resistant piston rings or seals capable of operating efficiently in high pressure turbine static sealing applications. This will significantly increase endurance life of engine components, and may significantly reduce overhaul costs by reducing the number of parts, in particularly the more expensive counterface parts, that can conventionally be stripped due to wear and thermal damage issues, for example caused by frictional heating.

The present disclosure is made in terms of a seal assembly wherein the seal is between two components at a mid-turbine-frame (MTF) location, for example in the high pressure turbine. It should be appreciated that the seal assembly, as well as the specific coating and lubrication strategy utilized in the disclosed seal assembly could have useful application in other areas and locations of a gas turbine engine as well, particularly areas where the combined conditions of high temperature and significant vibratory motion are experienced.

One or more embodiments of the present disclosure have been described. Nevertheless, it will be understood that various modifications may be made without departing from the spirit and scope of the disclosure. For example, different materials and seal configurations could be utilized, and seals in other locations may benefit from the disclosure coating. Accordingly, other embodiments are within the scope of the following claims.

What is claimed is:

1. A piston seal assembly for a gas turbine engine, comprising:
   a seal comprised of a nickel-based superalloy;
   a component in contact with the seal and defining a seal-counterface, wherein the seal and seal-counterface define a static seal assembly; and
   a coating on the seal at the seal-counterface, wherein the coating comprises a nanostructured, self-lubricating coating material, wherein the coating has a thickness of between 4 and 10 mils, wherein the coating comprises a binder matrix, a hardener and a solid lubricant, wherein the hardener and the solid lubricant are distributed through the binder matrix, wherein the binder matrix is a nickel-based composition selected from the group consisting of NiCr, Ni—Co, NiMoAl and combinations thereof, wherein the hardener is selected from the group consisting of glass, chrome carbide ($Cr_3C_2$), chrome oxide and combinations thereof, and wherein the solid lubricant is selected from the group consisting of silver, calcium fluoride, barium fluoride and combinations thereof.

2. The assembly of claim 1, wherein the coating has a thickness of between 4 and 7 mils.

3. The assembly of claim 1, wherein the nanostructured, self-lubricating coating material is selected from the group consisting of NiCr—$CaF_2$-glass, NiCr—$CaF_2$-glass-Ag, Ni—Co—$Cr_3C_2$—Ag—$BaF_2/CaF_2$, NiCr—$Cr_2O_3$—Ag—$BaF_2/CaF_2$ and NiMoAl—$Cr_2O_3$—Ag—$BaF_2/CaF_2$.

4. The assembly of claim 1, wherein the nanostructured, self-lubricating material is selected from the group consisting of NiCr—$Cr_2O_3$—Ag—$BaF_2/CaF_2$ and NiMoAl—$Cr_2O_3$—Ag—$BaF_2/CaF_2$, and mixtures thereof.

5. The assembly of claim 1, wherein the seal comprises an age hardening austenitic nickel-based superalloy.

6. The assembly of claim 1, wherein the seal has non-contact surfaces that are not in contact with the component, and the coating is on the seal at the seal-counterface, and not on the non-contact surfaces.

7. The assembly of claim 1, wherein the component comprises two components, with the seal mounted between the two components to define two seal-counterfaces, and wherein the coating is on the seal at both of the two seal-counterfaces.

8. The assembly of claim 1, wherein the two components comprise a mid-turbine-frame (MTF) vane and an outer air seal.

9. The assembly of claim 1, wherein the component has a counterface that defines, with the seal, the seal-counterface, and further comprising a further coating on the counterface.

10. The assembly of claim 9, wherein the further coating comprises the same material as the coating on the seal.

11. A seal for a gas turbine engine, comprising a seal comprised of a nickel-based superalloy and a coating on the seal, wherein the coating comprises a nanostructured, self-lubricating coating material, wherein the coating has a thickness of between 4 and 10 mils, wherein the coating comprises a binder matrix, a hardener and a solid lubricant, wherein the hardener and the solid lubricant are distributed through the binder matrix, wherein the binder matrix is a nickel-based composition selected from the group consisting of NiCr, Ni—Co, NiMoAl and combinations thereof, wherein the hardener is selected from the group consisting of glass, chrome carbide ($Cr_3C_2$), chrome oxide and combinations thereof, and wherein the solid lubricant is selected from the group consisting of silver, calcium fluoride, barium fluoride and combinations thereof.

12. The seal of claim 11, wherein the coating has a thickness of between 4 and 7 mils.

13. The seal of claim 11, wherein the nanostructured, self-lubricating coating material is selected from the group consisting of NiCr—$Cr_2O_3$—Ag—$BaF_2/CaF_2$ and NiMoAl—$Cr_2O_3$—Ag—$BaF_2/CaF_2$, and mixtures thereof.

14. The seal of claim 11, wherein the seal comprises an age hardening austenitic nickel-based superalloy.

* * * * *